United States Patent
Tsuge et al.

(10) Patent No.: US 8,160,447 B2
(45) Date of Patent: Apr. 17, 2012

(54) COMMUNICATION SYSTEM USING PASSIVE OPTICAL NETWORK AND PASSIVE OPTICAL NETWORK

(75) Inventors: Munetoshi Tsuge, Fujisawa (JP); Takashi Mori, Yokohama (JP); Masanobu Kobayashi, Yokohama (JP); Yoshio Miyamori, Yokohama (JP); Shinobu Gohara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 831 days.

(21) Appl. No.: 12/147,616

(22) Filed: Jun. 27, 2008

(65) Prior Publication Data
US 2009/0103918 A1  Apr. 23, 2009

(30) Foreign Application Priority Data
Oct. 17, 2007  (JP) .................. 2007-269647

(51) Int. Cl.
*H04B 10/00* (2006.01)
(52) U.S. Cl. .............. 398/115; 398/74; 398/72; 398/66; 398/58
(58) Field of Classification Search .......... 398/45, 398/58, 66, 67, 70, 71, 72, 74, 46, 115, 116
See application file for complete search history.

(56) References Cited

U.S. PATENT DOCUMENTS

| | | | |
|---|---|---|---|
| 5,948,063 A * | 9/1999 | Cooper et al. ................ 709/223 |
| 5,982,514 A * | 11/1999 | Suzuki et al. ................ 398/20 |
| 6,278,707 B1 * | 8/2001 | MacMillan et al. .......... 370/352 |
| 6,684,030 B1 * | 1/2004 | Taylor et al. ................ 398/59 |
| 6,839,829 B1 * | 1/2005 | Daruwalla et al. ............. 712/28 |
| 6,970,461 B2 * | 11/2005 | Unitt et al. ................. 370/390 |
| 7,013,087 B2 * | 3/2006 | Suzuki et al. ................ 398/115 |
| 7,317,733 B1 * | 1/2008 | Olsson et al. ................ 370/466 |
| 7,386,010 B2 * | 6/2008 | Solomon et al. ............. 370/466 |
| 7,394,985 B1 * | 7/2008 | Wang et al. ................. 398/75 |
| 7,630,637 B2 * | 12/2009 | Mizutani et al. .............. 398/67 |
| 7,643,421 B2 * | 1/2010 | Tsuge et al. ................. 370/235 |
| 7,715,413 B2 * | 5/2010 | Vaziri et al. ................. 370/401 |

(Continued)

FOREIGN PATENT DOCUMENTS
JP 2007-124336 5/2007
(Continued)

OTHER PUBLICATIONS

Bernstein et al., "Future Directions in the Battle Between Cable and PON", SCTE 2007 Conference on Emerging Technologes.

(Continued)

*Primary Examiner* — Kenneth N Vanderpuye
*Assistant Examiner* — Hibret Woldekidan
(74) *Attorney, Agent, or Firm* — Antonelli, Terry, Stout & Kraus, LLP.

(57) ABSTRACT

An OLT transmits and receives a CMTS/CM apparatus control signal through an apparatus physical management interface which is physically identical to or different from a main signal interface (NNI) and processes the CMTS apparatus control signal by itself. When connection of a new ONU is detected by an ONU apparatus control signal, an IP address is allocated by using the CM apparatus control signal in a manner similar to the CM. The CM apparatus control signal regarding the ONU is transmitted and received by using the IP address and a mutual conversion is performed between the CM apparatus control signal and the ONU apparatus control signal. The ONU processes the ONU apparatus control signal in a manner similar to the ONU based on an ordinary PON standard.

9 Claims, 12 Drawing Sheets

U.S. PATENT DOCUMENTS

| | | | |
|---|---|---|---|
| 7,734,175 B2* | 6/2010 | Amemiya et al. | 398/51 |
| 7,912,071 B2* | 3/2011 | Ikeda et al. | 370/395.53 |
| 8,023,820 B2* | 9/2011 | Bernard et al. | 398/66 |
| 8,036,530 B2* | 10/2011 | Arnold et al. | 398/58 |
| 2002/0048071 A1* | 4/2002 | Suzuki et al. | 359/173 |
| 2003/0007211 A1* | 1/2003 | Gummalla et al. | 359/136 |
| 2007/0230481 A1* | 10/2007 | Ikeda et al. | 370/395.53 |
| 2007/0264017 A1* | 11/2007 | Mizutani et al. | 398/72 |
| 2007/0274718 A1* | 11/2007 | Bridges et al. | 398/63 |
| 2008/0193137 A1* | 8/2008 | Thompson et al. | 398/115 |
| 2008/0232801 A1* | 9/2008 | Arnold et al. | 398/58 |
| 2008/0260389 A1* | 10/2008 | Zheng | 398/115 |
| 2008/0291196 A1* | 11/2008 | Ceruti et al. | 345/418 |

FOREIGN PATENT DOCUMENTS

| | | |
|---|---|---|
| JP | 2007-516644 | 6/2007 |
| WO | WO 2004/107634 A3 | 12/2004 |

OTHER PUBLICATIONS

Bernstein, "A Proposal for DOCSIS® 4.0: The Best of Both Worlds, DOCSIS and PON", Emerging Technologies Jan. 14-16, 2008.

Bernstein et al., "A Proposal for DOCSIS® 4.0: The Best of Both Worlds, DOCSIS and PON", Emerging Technologies Jan. 15, 2008.

* cited by examiner

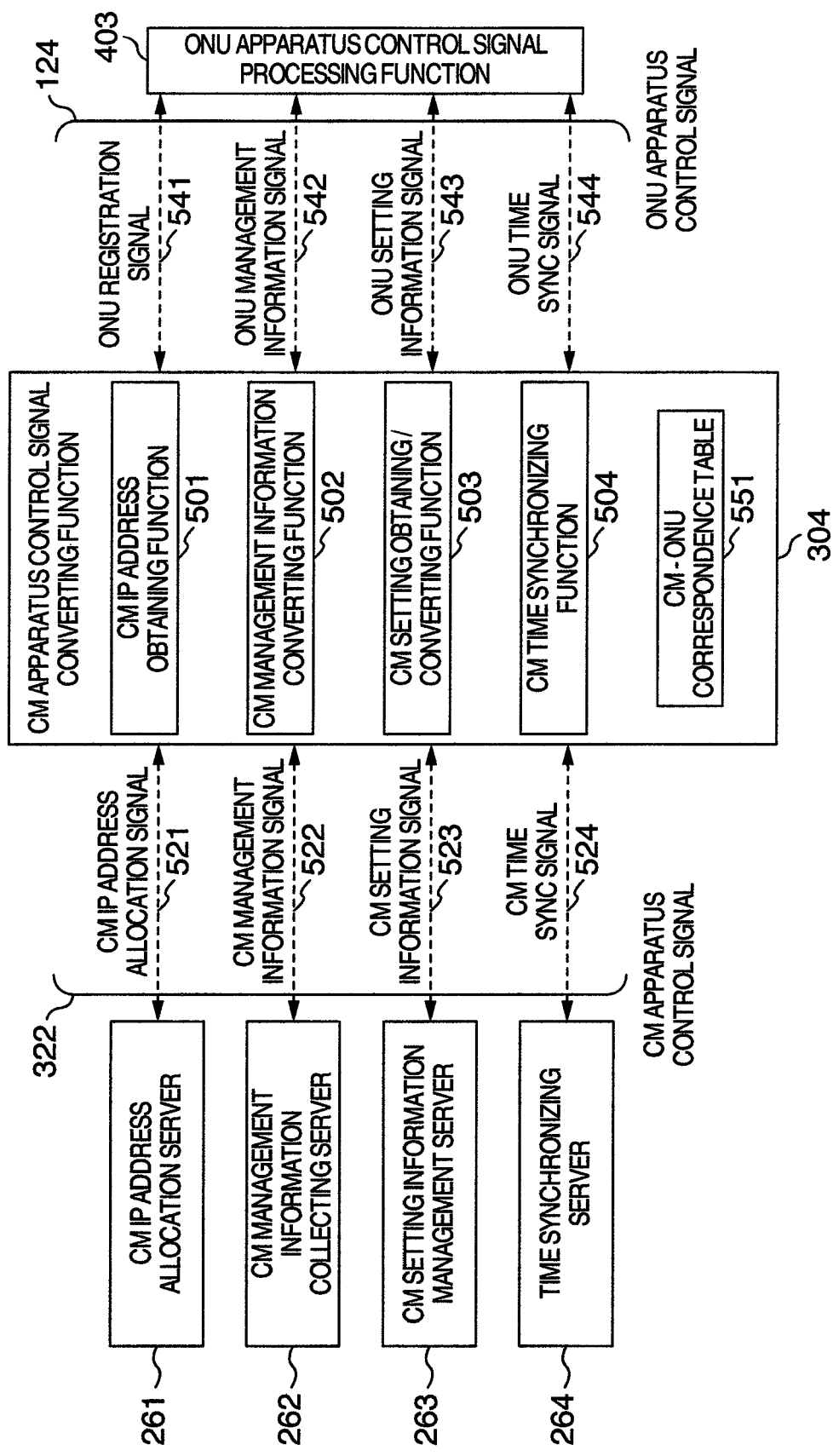

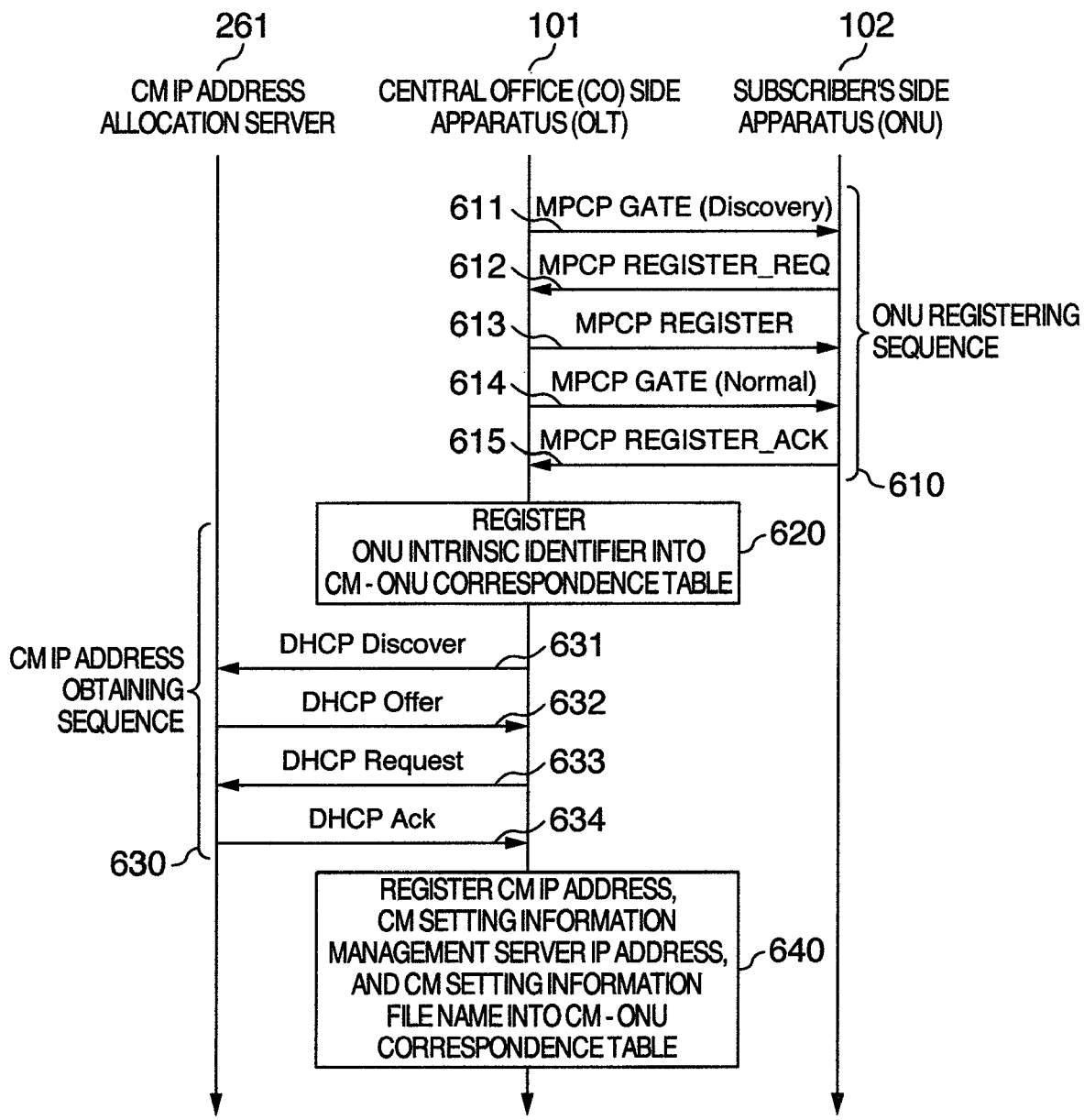

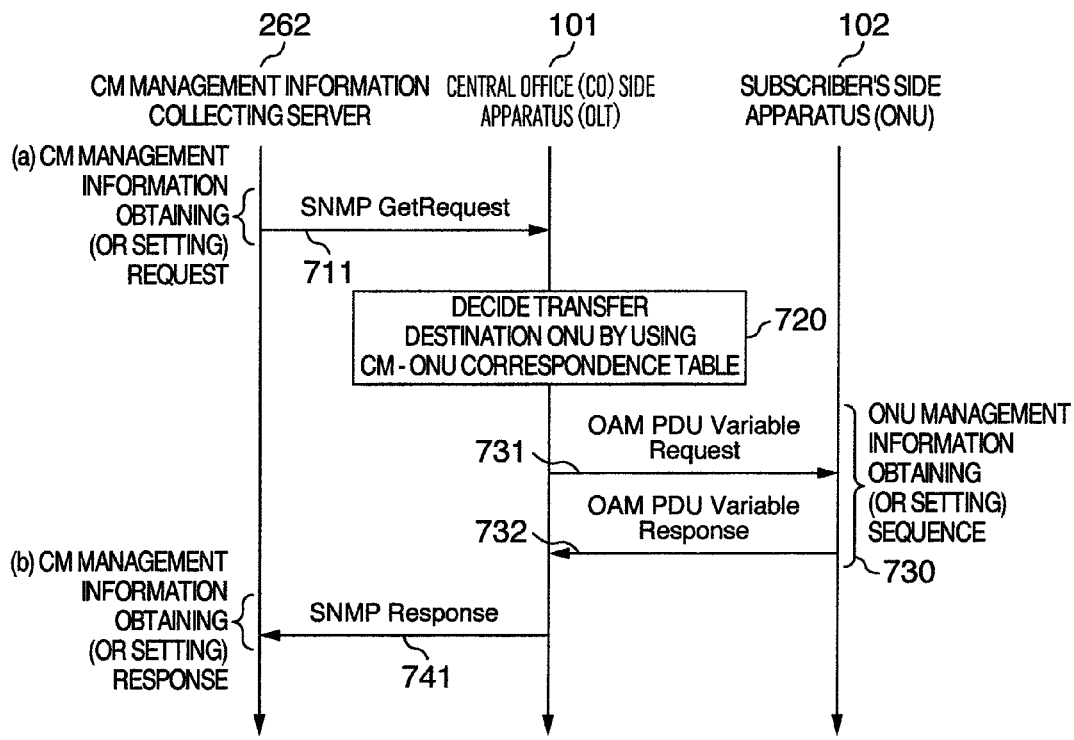
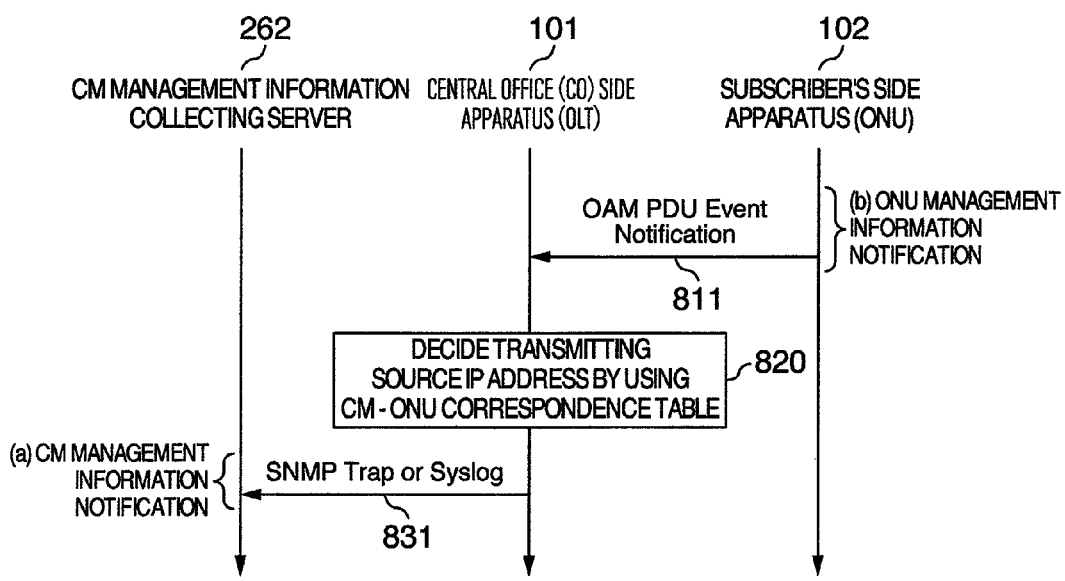

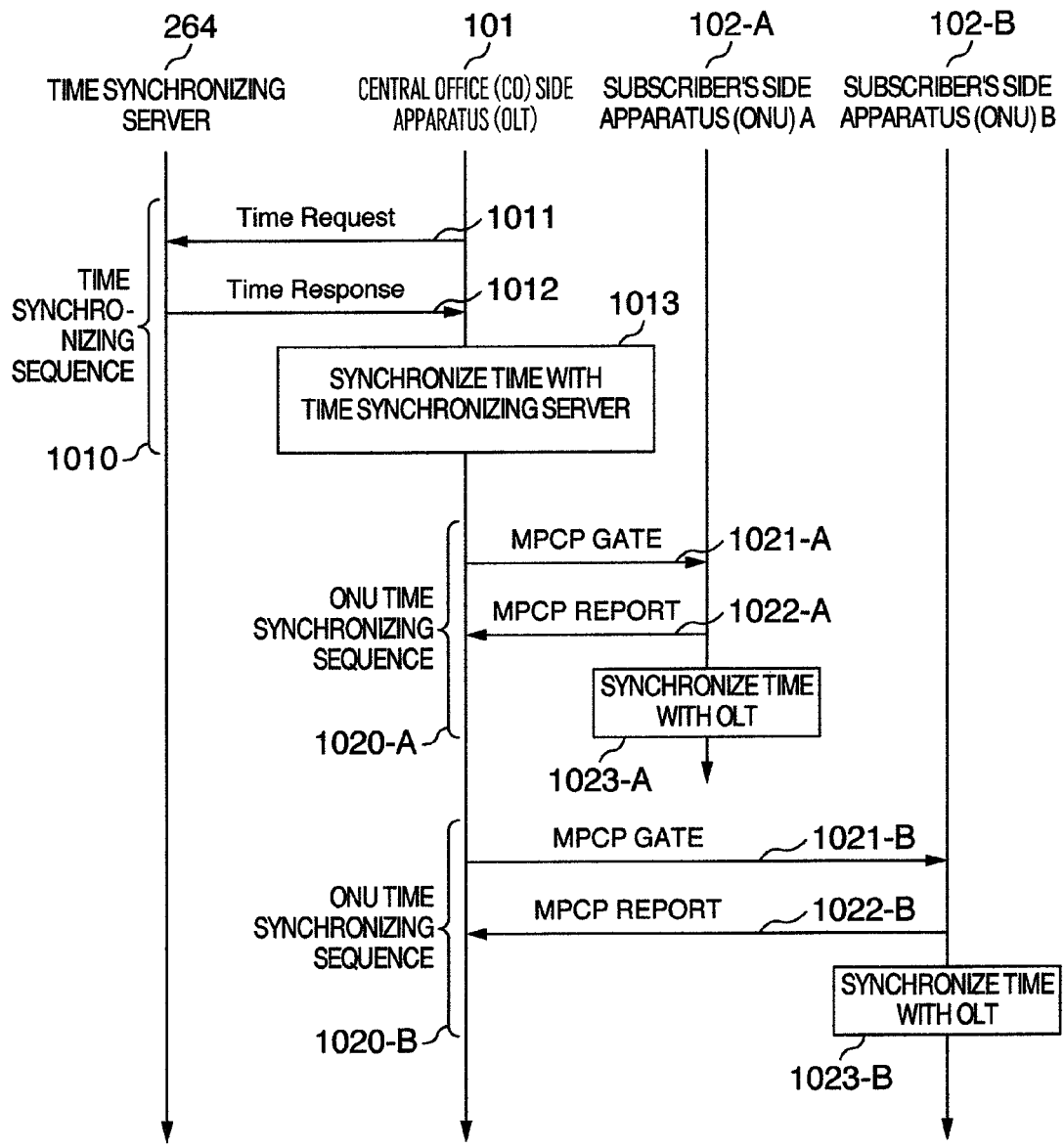

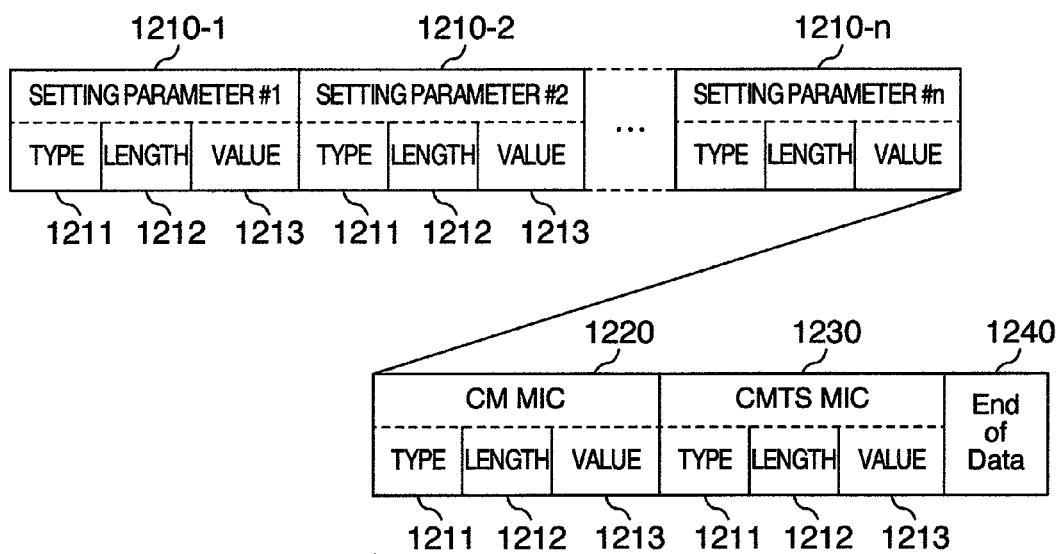

COMMUNICATION SYSTEM USING PASSIVE OPTICAL NETWORK AND PASSIVE OPTICAL NETWORK

INCORPORATION BY REFERENCE

The present application claims priority from Japanese application JP2007-269647 filed on Oct. 17, 2007, the content of which is hereby incorporated by reference into this application.

BACKGROUND OF THE INVENTION

1. Field of the Invention

The invention relates to a communication system which is constructed by an optical fiber line, an optical splitter, and apparatuses arranged at both ends thereof, which enables transmission and reception of a data packet between the apparatuses at both ends, and which enables one of the apparatuses to make management and setting of the other apparatus, wherein a passive optical network (hereinbelow, abbreviated to PON) is used as a network constructed by presuming use of a CMTS (Cable Modem Termination System) and a CM (Cable Modem).

2. Description of the Related Art

In recent years, video distribution services of an IP (Internet Protocol) base mainly according to a video-on-demand form by a communication carrier who provides Internet connection services or a video service providing entrepreneur on the Internet are increasing. Realization of high picture quality of those services is also expected in the future. Therefore, realization of a further high speed of data communication is also demanded in an access line between the communication carrier and general homes or general enterprises as customers (hereinbelow, they are collectively called subscribers).

To realize the high speed of the access line, a construction of the access line using an optical fiber is progressing in each district. Although there are various kinds of systems as communication systems using the optical fibers, the system which has been spread most in the access line is a PON system. The PON system is constructed by the following three kinds of apparatuses: an OLT (Optical Line Terminal) which is provided on a central office (CO) side of the communication carrier and corresponds to a master station; an optical splitter for branch-relaying a photosignal received from one optical fiber toward a plurality of optical fibers as it is; and an ONU (Optical Network Unit; also called ONT (Optical Network Terminal)) which is provided in an individual subscriber's home or a building in which a plurality of subscribers exist and corresponds to a slave station. One optical fiber which connects the OLT and the optical splitter is branched to a plurality of optical fibers by the optical splitter and each optical fiber is connected to one ONU.

As one of forms of the conventional Internet connection services, there is a cable Internet using a coaxial cable line provided for video distribution of a cable television. Although the access line of the cable Internet is generally either a coaxial cable in which the whole interval is a kind of electric wire or an HFC (Hybrid Fiber Coax) in which an interval on the side (upstream side) close to the central office (CO) has been replaced by an optical fiber, the coaxial cable is used in an interval on the side (downstream side) close to the subscriber's home in any of the coaxial cable and the HFC. Generally, the CMTS (Cable Modem Termination System) and the CM (Cable Modem) are used for the apparatus on the central office (CO) side and the apparatus on the subscriber's home side, respectively. The CMTS is an apparatus which has a coaxial cable interface and operates as a router or a layer 2 switch. The CM is an apparatus which has a coaxial cable interface and operates as a bridge or a broadband router.

The cable Internet in which the coaxial cable is used for the access line is disadvantageous in terms of a line speed as compared with the PON in which the whole interval of the access line is the optical fiber. As disclosed in JP-B-2007-516644 and JP-A-2007-124336, a method of improving a communication speed by binding a plurality of channels is also considered as one of measures for solving such a problem. However, even if four channels are bound, the line speed of up to about 160 Mbits/sec can be provided for the subscriber. On the other hand, the PON system using the standard of GPON (Gigabit PON) or GE-PON (Gigabit Ethernet PON) (Ethernet is a registered trademark) which is a main stream at present can provide the line speed of 1 Gbits/sec or higher for the subscriber.

It is considered that the most effective and simplest method of raising the speed of the access line of the cable Internet is a method whereby the station side apparatus is replaced by the OLT from the CMTS, the subscriber's apparatus is replaced by the ONU from the CM, and the access line between those apparatuses is replaced by the optical fiber and the optical splitter.

However, in such a case, it is necessary that each of the OLT and the ONU which are used for replacement has an interface which can be connected, without a problem, to a communicating apparatus which has already been used in its peripheral network.

That is, when mentioning about communication of a main signal, it is necessary that an interface of an upstream side network of the OLT (hereinbelow, called NNI (Network Node Interface) or SNI (Service Node Interface)) has compatibility with an interface of an upstream side network of the CMTS (hereinbelow, called NSI (Network Side Interface)) and can be connected to the router or layer 2 switch locating on the upstream side. It is also necessary that an interface of a downstream side network of the ONU (hereinbelow, called UNI (User Network Interface)) has compatibility with an interface of a downstream side network of the CM (hereinbelow, called CMCI (Cable Modem to CPE Interface)) and can be connected to a PC (Personal Computer) or a CPE (Customer Premise Equipment) such as a broadband router locating on the downstream side.

Further, when mentioning about communication of a control signal, it is necessary that, in place of the CMTS, the OLT receives a CMTS control signal for operating management, setting, and the like for the CMTS and reflects it to its own operation. In addition, it is necessary that the OLT relays a CM control signal which has been transmitted to the CM through the CMTS toward the ONU and the ONU receives the CM control signal and reflects it to its own operation.

Among those requirements, with respect to the main signal interface, since any of the NNI of the OLT and the NSI of the CMTS is substantially the same as the interface which the general router or layer 2 switch has, it can be also connected to peripheral communicating apparatuses without any problem. Also with respect to each of the UNI of the ONU and the CMCI of the CM, since it is a LAN (Local Area Network) interface which is used in a general home or enterprise, there is no problem in connecting performance.

However, with respect to the control signals, the control signals of the PON system and the control signals of the CMTS and the CM differ largely. The CMTS/CM control signals conform with the standard regarding the cable Internet which is generally called DOCSIS (Data-Over-Cable Service Interface Specifications) which is a trademark of Cable Television Laboratories, Inc. and has been specified by CableLabs (which is a trademark of Cable Television Laboratories, Inc.). The standard of those control signals differ from the standard of the OLT and the ONU. For example, in the DOCSIS standard, with respect to a data structure called MIB (Management Information Base) of a communicating apparatus management protocol called SNMP (Simple Network Management Protocol), it is specified that the CMTS and the CM should cope with such a data structure. However, a part of the data structure is unique to the DOCSIS standard and other communicating apparatuses including the OLT and the ONU do not cope with such a part of the data structure.

Particularly, with respect to the control of the CM, not only the control signal data structure such as an MIB of the SNMP but also a control method differ from those of the ONU. That is, according to the DOCSIS standard, the CM obtains an IP address of the CM itself from a DHCP server by using an IP address allocation protocol called DHCP (Dynamic Host Configuration Protocol). Address information of a TFTP (Trivial File Transfer Protocol) server, a file name of initial setting information which should be received from the TFTP server, and address information of a Time server are included in a message received from the DHCP server. Based on those information, the CM executes transmission of management information to an SNMP manager, obtainment of the initial setting information from the TFTP server, and IP communication for time synchronization with the Time server. Those various kinds of servers are generally located in a network of an upstream side of the CMTS.

The ONU does not have the IP address for control communication and does not execute the obtainment of the IP address which is executed by the DHCP. Therefore, the ONU itself does not execute communication of the SNMP, TFTP, and Time protocols as communication using an IP layer. In place of it, between the OLT and the ONU (hereinbelow, referred to as a PON interval), similar functions are realized by using a communication protocol based on the standard of the PON which is used by those apparatuses (or to which an expansion unique to a vendor has been added). For example, in the GE-PON, initial registration communication and time synchronous communication of the ONU to the OLT are made by an MPCP (Multi Point Control Protocol) protocol of the IEEE (Institute of Electrical and Electronics Engineers, Inc.) 802.3ah standard and communication of management information regarding the ONU is made by an OAM (Operation, Administration and Maintenance) sub-layer of the IEEE 802.3ah standard.

A method whereby while the difference between the PON and the CMTS/CM mentioned above is left, the PON is provided and operated is also considered. In such a case, however, since it is necessary that both of an apparatus management system for the CMTS/CM and an apparatus management system for the PON are provided for an upstream apparatus management network, the management becomes complicated. Further, although a method of integrating only a user interface for management of both of them is also considered, large development costs are required in such a case.

As another solving method, a method of changing the control communicating method of the PON interval to a method similar to that between the CMTS and the CM is also considered. In such a case, however, not only the control communication of the PON interval differs largely from that of the PON standard but also a development for making control communication similar to that between the CMTS and the CM is necessary for both of the OLT and the ONU.

SUMMARY OF THE INVENTION

It is an object of the invention to provide a PON system which can be easily installed by a communication carrier in which a CMTS and a CM have already been installed in place of the CMTS and the CM without largely changing peripheral apparatuses or system such as an apparatus management system and the like and without largely changing a communication system of a PON interval from a PON standard and which can make management similar to that of the CMTS and the CM.

To accomplish the above object, in a PON which is used in a communication system of the invention, an OLT as its station side apparatus transmits and receives control signals of the same format as that of apparatus control signals of a CMTS and a CM (hereinbelow, simply referred to as a CMTS apparatus control signal and a CM apparatus control signal) through its apparatus management interface.

The OLT processes the received CMTS apparatus control signal by itself. In the case of transmitting the apparatus control signal from the apparatus management interface, the OLT transmits it in a format of the CMTS apparatus control signal.

The OLT converts the CM apparatus control signal received in the apparatus management interface into an ONU apparatus control signal which is used in the PON interval and transmits toward the ONU. On the contrary, the OLT converts the ONU apparatus control signal received from the ONU through the PON interval into the CM apparatus control signal and transmits it from the apparatus management interface.

More specifically speaking, when the OLT detects that a new ONU has been connected to the OLT by a protocol of the PON interval, the OLT receives by itself an IP address which should inherently be received by the CM by using the DHCP and stores the IP address in correspondence to the ONU.

Subsequently, the OLT receives the initial setting information of the CM by using the address information and the file name of the TFTP server obtained by the DHCP and makes initial setting corresponding to its contents to the ONU by using the protocol of the PON interval (or, reflects it to the setting of the OLT itself). For example, in the case of the PON based on the GE-PON standard, the setting of an upstream communication bandwidth included in an initial setting file is reflected to the setting of a communication bandwidth control (hereinbelow, referred to as a DBA (Dynamic Bandwidth Allocation)) function of the PON interval by using the MPCP.

When an SNMP message is received in the apparatus management interface, the OLT discriminates which ONU (or the OLT itself) should process the SNMP message on the basis of its destination IP address and transfers the message converted into the protocol of the PON interval toward the ONU. On the contrary, when the apparatus management information according to the protocol of the PON interval is received from the ONU, the OLT examines the IP address allocated to the ONU by using a correspondence table of the ONU and the allocated IP address. The apparatus management information is converted into the SNMP message and the SNMP message is transmitted from the apparatus management interface by using the IP address as a transmitting source.

The ONU of the invention transmits and receives the ONU apparatus control signal to/from the OLT through the PON interval in a manner similar to that of the ONU based on the PON standard. That is, the ONU of the invention is the same as the ONU of the general PON system.

Since the PON of the invention is seen in a manner similar to that of the CMTS and the CM from the apparatus management system, the system administrator can control the PON system by a method similar to that of the CMTS and the CM. The control signals which are used in the PON interval of the PON system are similar to those of the general PON system.

According to the invention, the communication carrier in which the CMTS and the CM have already been installed can easily install the PON merely by installing the optical fiber and providing the PON system of the invention with hardly modifying the apparatus management system. Moreover, since the same apparatus management system as that for the CMTS and the CM can be used, the system administrator can easily manage the PON and can also suppress an additional investment to the apparatus management system. Owing to the installation of the PON, the access line of a speed of 1 Gbits/sec or higher which cannot be provided by the cable Internet using the coaxial cable can be provided to the subscriber.

The communication in the PON interval which is made by the PON of the invention is the same as the general PON system using the PON standard and the functions which the ONU of the invention has are the same as those of the ONU of the general PON system. Therefore, the system can be also formed by combining the OLT of the invention with another general ONU using the same PON standard.

Other objects, features and advantages of the invention will become apparent from the following description of the embodiments of the invention taken in conjunction with the accompanying drawings.

BRIEF DESCRIPTION OF THE DRAWINGS

FIG. 5 is a block constructional diagram showing an example of a construction of a CM apparatus control signal converting function provided for the OLT and a construction of signals which are transmitted and received;

FIG. 6 is a sequence diagram showing an example of the operation of a CM IP address obtaining function provided for the OLT;

FIG. 7 is a sequence diagram showing an example of the operation of a CM management information converting function provided for the OLT;

FIG. 8 is a sequence diagram showing an example of the operation of the CM management information converting function provided for the OLT;

FIG. 10 is a sequence diagram showing an example of the operation of a CM time synchronizing function provided for the OLT;

FIG. 11 is a constructional diagram of a memory showing an example of a construction of a CM-ONU correspondence table provided for the OLT;

FIG. 12 is a frame constructional diagram showing an example of a construction of a CM setting information file which is obtained from a CM setting information management server;

DESCRIPTION OF THE INVENTION

A construction and the operation of a communication system using a PON of the invention will be described in detail hereinbelow with reference to the drawings. Although an example in which a GE-PON which has been standardized by the IEEE standard 802.3ah is used as a PON of the invention will be described hereinbelow, the invention can be also embodied by applying another PON such as a GPON or the like which has been standardized by the ITU-T standard G.983.

Figure 1:
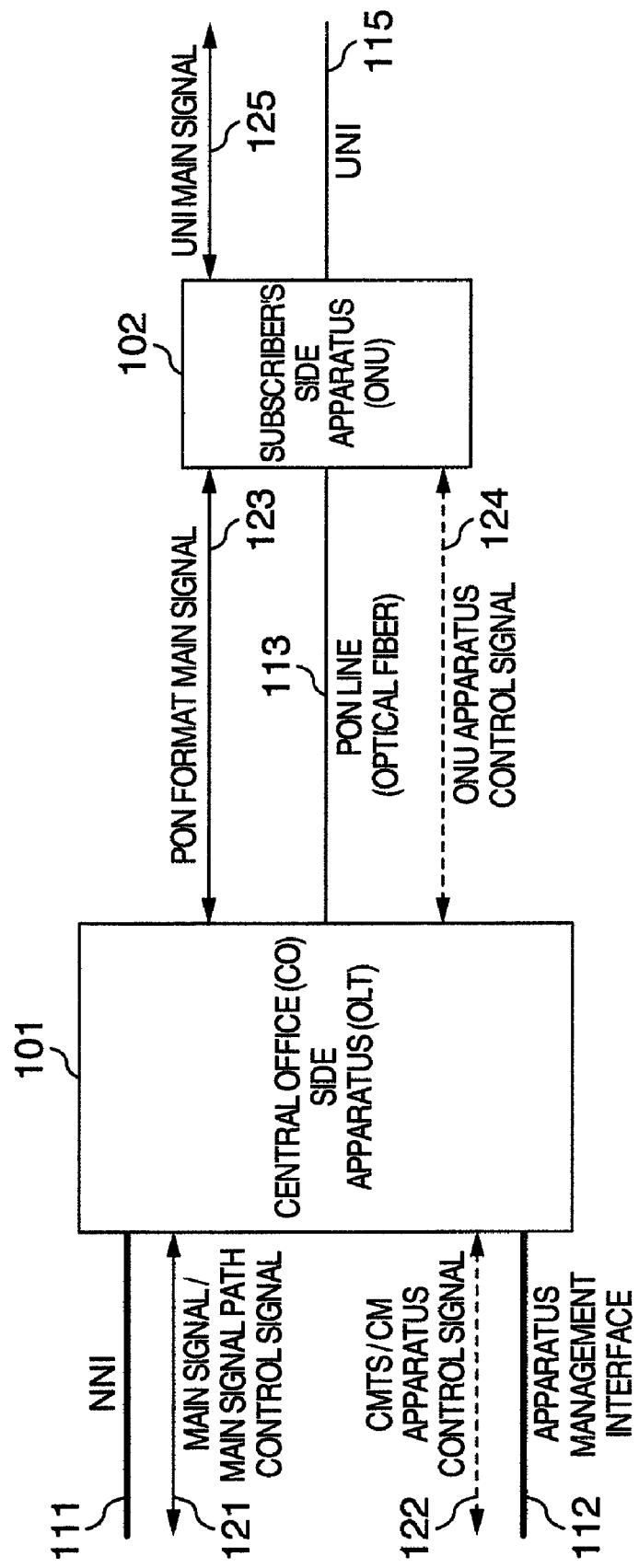
FIG. 1 is an explanatory diagram showing an example of a construction of apparatuses of a PON and a communication interface and a construction of signals which are transmitted and received.

FIG. 1 is an explanatory diagram showing an example of a construction of apparatuses of the PON and a communication interface and a construction of signals which are transmitted and received.

The PON of the invention is constructed by an OLT 101 as a station side apparatus and an ONU 102 as a subscriber's side apparatus. In an interval between the OLT 101 and the ONU 102 (PON interval), they are connected by a PON line 113. Generally, a physical media of the PON line 113 is an optical fiber. Although a construction in which a branch-combining apparatus (of a photosignal) called an optical splitter for executing a process such as branch/combination or the like to the photosignal is provided on the way of the PON line 113 and a plurality of ONUs 102 are provided is a general construction, it is not omitted in the diagram. The invention can be embodied without a problem irrespective of the construction in which one ONU is provided or the construction in which a plurality of ONUs are provided.

The OLT 101 has an NNI 111 and an apparatus management interface 112 serving as physical interfaces which are connected to a network on an upstream side of the OLT. Although each of the NNI 111 and the apparatus management interface 112 is shown as one physical interface in the diagram, it can be also constructed by a plurality of physical interfaces. The ONU 102 has a UNI 115 as a physical interface which is connected to a network on a downstream side of the ONU. The UNI 115 may be constructed by a plurality of physical interfaces in a manner similar to the NNI 111.

The OLT 101 transmits and receives a main signal and a main signal path control signal 121 to/from the network on the upstream side through the NNI 111. The OLT 101 also transmits and receives an apparatus control signal 122 of the CMTS and the CM to/from the upstream network through the apparatus management interface 112. Further, the OLT 101 transmits and receives a main signal 123 of a PON format and an apparatus control signal 124 of the ONU to/from the ONU 102 through the PON line 113. The ONU 102 transmits and receives a main signal 125 to/from the downstream network through the UNI 115. Further, the ONU 102 transmits and receives the main signal 123 of the PON format and the apparatus control signal 124 of the ONU to/from the OLT 101 through the PON line 113. Various control signals which are transmitted and received between a communicating apparatus arranged on the upstream network of the OLT 101 and a communicating apparatus arranged on the downstream network of the ONU 102 are also included in the main signal.

Figure 2:
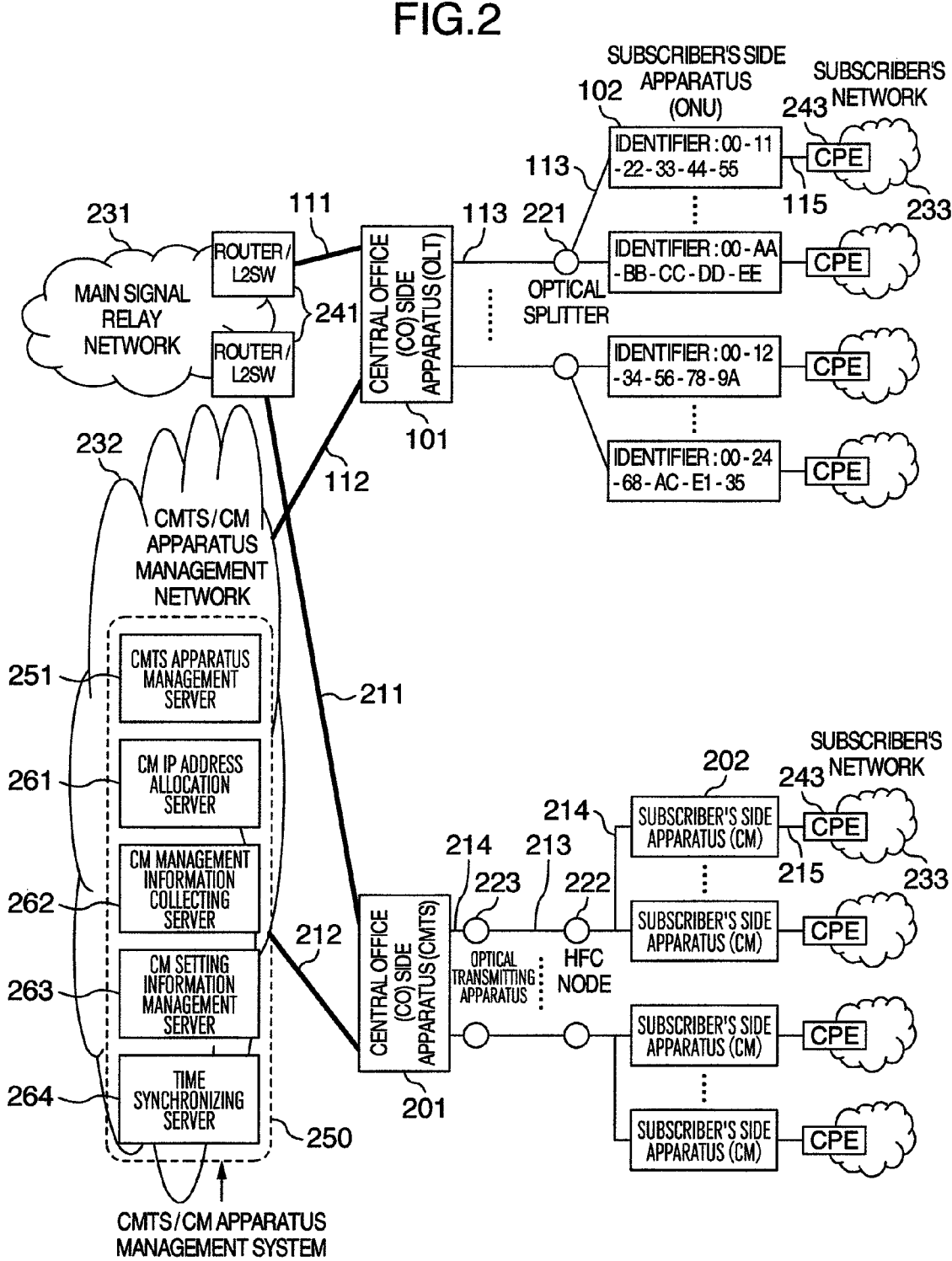
FIG. 2 is a system constructional diagram showing an example of a construction of a communication system using the PON of the invention.

FIG. 2 is a system constructional diagram showing an example of a construction of a communication system using the PON of the invention.

Although the construction in which an optical splitter 221 is arranged on the way of the PON line 113 and the OLT 101 includes a plurality of PON lines 113 is illustrated in the diagram, the invention can be also embodied irrespective of the presence or absence of the optical splitter 221 and the number of PON lines 113 which can be enclosed in the OLT 101. Although one OLT 101 is arranged in the diagram, the invention can be also embodied even if a plurality of OLTs 101 are arranged.

The NNI 111 of the OLT 101 is connected to a router or layer 2 switch 241 serving as a node to a main signal relay network 231. The apparatus management interface 112 is connected to an apparatus management network 232 of the CMTS and the CM. The UNI 115 of the ONU 102 is connected to a CPE 243 serving as a node to a subscriber's network 233.

Besides the OLT 101, a CMTS 201 as a station side apparatus of the cable Internet is connected to a downstream of the main signal relay network 231 and the CMTS/CM apparatus management network 232. The CMTS is connected to the router or layer 2 switch 241 serving as a node to the main signal relay network 231 through an NSI 211 and is connected to the CMTS/CM apparatus management network 232 through an apparatus management interface 212.

Generally, the downstream side interface of the CMTS 201 is a coaxial cable 214 and it is connected to a CM 202 as a subscriber's side apparatus. Although there is a case where the CMTS 201 and the CM 202 are directly connected by the coaxial cable 214, there is also a case where they are temporarily connected through an optical fiber 213. In the case where they are connected through the optical fiber 213, a conversion between an electric signal of the coaxial cable 214 and a photosignal of the optical fiber 213 is executed by an optical transmitting apparatus 223 arranged on the station side and an HFC node 222 arranged on the way of the line. A CMCI 215 of the CM 202 is connected to the CPE 243 serving as a node to a subscriber's network 233.

The invention can be embodied irrespective of the construction of the downstream network of the CMTS 201. Although one CMTS 201 is arranged in the diagram, the invention can be also embodied even if a plurality of CMTSs 201 are arranged or even if no CMTSs 201 are arranged.

The main signal relay network 231 is a network for enabling communication between the subscriber's networks 233 or communication between the subscriber's network 233 and a host existing in the main signal relay network 231 by transmitting and receiving the main signal to/from the station side apparatus. A network of the communication carrier who provides the communication services to the subscribers is included in the main signal relay network 231, or a network or Internet of another communication carrier may be included. The subscriber's networks 233 is a network of the subscriber himself constructed in a home, an enterprise base point, or the like.

The CMTS/CM apparatus management network 232 is a network of the communication carrier having a CMTS/CM apparatus management system 250. The network administrator of the communication carrier operates and monitors the CMTS/CM apparatus management system 250, thereby managing the CMTS 201 and the CM 202. As will be described in detail hereinbelow, the PON system of the invention can manage by using the CMTS/CM apparatus management system 250.

The CMTS/CM apparatus management system 250 has a CMTS apparatus management server 251, a CM IP address allocation server 261, a CM management information collecting server 262, a CM setting information management server 263, and a time synchronizing server 264.

The CMTS apparatus management server 251 manages the CMTS 201 and the OLT 101 by transmitting and receiving the CMTS apparatus control signal between the CMTS 201 and the OLT 101.

The CM IP address allocation server 261 allocates an IP address for CM apparatus management and communication to the CM 202 and the PON by transmitting and receiving the a CM IP address allocation signal between the CM 202 and the PON (OLT 101) of the invention. Since the IP address allocated to the PON corresponds to an identifier of the ONU 102 or the like as will be described hereinafter, the PON can be easily provided for the system comprising the CMTS and the CM as mentioned above or as will be described in detail hereinafter.

The CM management information collecting server 262 collects apparatus management information of the CM 202 and the ONU 102 by transmitting and receiving a CM management information signal between the CM 202 and the PON.

The CM setting information management server 263 makes an initial setting of the CM 202 and the ONU 102 by transmitting and receiving a CM setting information signal between the CM 202 and the PON.

The time synchronizing server 264 sets proper time into the CM 202 and the ONU 102 by transmitting and receiving a CM time sync signal between the CM 202 and the PON.

The name and function share of each of the foregoing servers are shown as an example. Even if the construction of the servers in the CMTS/CM apparatus management system 250 (for example, the number and kinds of servers) is other than the foregoing construction, the invention can be embodied by another construction so long as functions and operations as will be described hereinafter are executed. For example, a part of the functions of the CMTS apparatus management server 251 may be included in the CM management information collecting server 262, or the functions of both of the CM setting information management server 263 and the time synchronizing server 264 may exist physically together in the same server, or servers other than the servers shown in FIG. 2 can be also included in the CMTS/CM apparatus management system 250.

Figure 3:
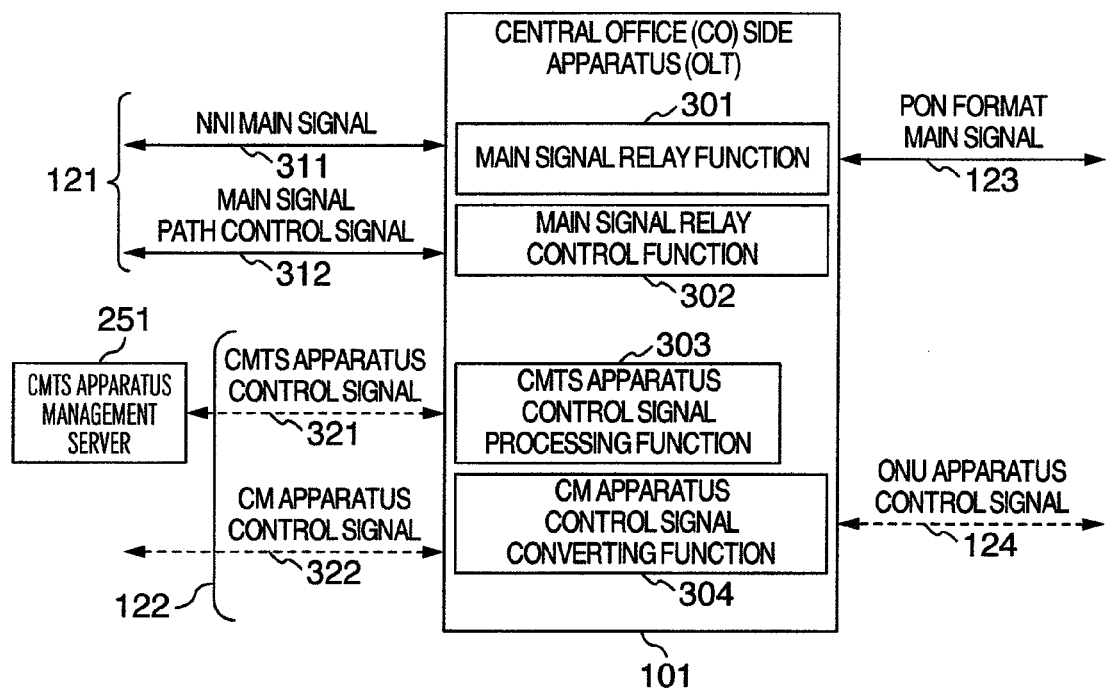
FIG. 3 is a block constructional diagram showing an example of a construction of internal functions of an OLT provided for the PON of the invention and signals which are transmitted and received by the respective functions.

FIG. 3 is a block constructional diagram showing an example of a construction of internal functions of the OLT provided for the PON of the invention and signals which are transmitted and received by the respective functions.

The OLT 101 has a main signal relay function 301, a main signal relay control function 302, a CMTS apparatus control signal processing function 303, and a CM apparatus control signal converting function 304. A detailed construction and the operation of each of the functions will be described hereinbelow.

The main signal relay function 301 receives an NNI main signal 311 in the main signal/main signal path control signal 121 from the NNI, converts it into the PON format main signal 123, and transmits to the PON line. If the PON is, for example, the GE-PON specified by IEEE 802.3ah, the PON format main signal 123 is a layer 2 frame in which an LLID (Logical Link ID) indicative of a destination (or transmitting source) ONU is included in a part of a preamble. The main signal relay function 301 receives the PON format main signal 123 from the PON line, converts it into the NNI main signal 311, and transmits to the NNI. The main signal relay function 301 receives information necessary to decide a proper relay destination when the NNI main signal 311 and the PON format main signal 123 are received from the main signal relay control function 302, CMTS apparatus control signal processing function 303, and CM apparatus control signal converting function 304.

The main signal relay control function 302 receives a main signal path control signal 312 in the main signal/main signal path control signal 121 from the NNI and executes a path control process according to its contents. There is also a case where the path control process is executed by using a part of packet data of the NNI main signal 311 and the PON format main signal 123. A result of the path control process is reflected to the process for deciding the relay destination of the main signal which is executed by the main signal relay function 301. In the case where the main signal relay function 301 relays the packet by Layer 3, the main signal relay control function 302 has functions such as various kinds of routing protocol processes, ARP (Address Resolution Protocol) process, IGMP (Internet Group Management Protocol) process, and the like. In the case where the main signal relay function 301 relays the packet by layer 2, the main signal relay control function 302 also has functions such as MAC (Media Access Control) address learning process, STP (Spanning Tree Protocol) process, IGMP snooping process, and the like.

The CMTS apparatus control signal processing function 303 receives a CMTS apparatus control signal 321 in the CMTS/CM apparatus control signal 122 from the CMTS apparatus management server 251 in the CMTS/CM apparatus management system 250 and executes a control process of the OLT 101 in accordance with contents of the signal 321. The CMTS apparatus control signal processing function 303 transmits the CMTS apparatus control signal 321 toward the CMTS apparatus management server 251 in the CMTS/CM apparatus management system 250 in accordance with a processing result of the received CMTS apparatus control signal 321 and an operation situation of the OLT 101. Owing to the above functions, the CMTS/CM apparatus management system 250 can obtain management information of the OLT 101 and can make various kinds of settings by substantially the same method as that of the CMTS.

The CM apparatus control signal converting function 304 receives a CM apparatus control signal 322 in the CMTS/CM apparatus control signal 122 from the CMTS/CM apparatus management system 250, converts it into the ONU apparatus control signal 124, and transmits it to the PON line. The CM apparatus control signal converting function 304 also receives the ONU apparatus control signal 124 from the PON line, converts it into the CM apparatus control signal 322, and transmits it toward the CMTS/CM apparatus management system 250. Owing to such functions, the CMTS/CM apparatus management system 250 can obtain management information of the ONU 102 and can make various kinds of settings by substantially the same method as that of the CM.

Figure 4:
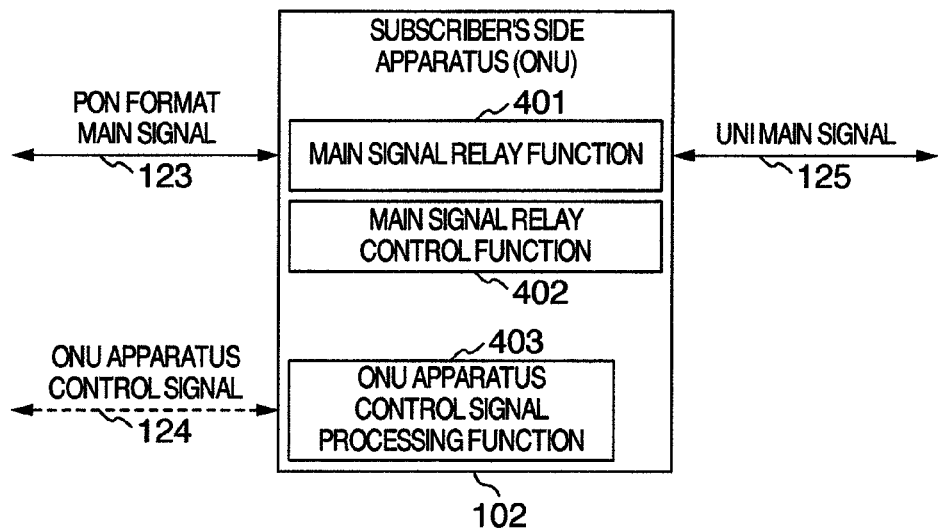
FIG. 4 is a block constructional diagram showing an example of a construction of internal functions of an ONU provided for the PON of the invention and signals which are transmitted and received by the respective functions.

FIG. 4 is a block constructional diagram showing an example of a construction of internal functions of the ONU provided for the PON of the invention and signals which are transmitted and received by the respective functions.

The ONU 102 has a main signal relay function 401, a main signal relay control function 402, and an ONU apparatus control signal processing function 403. A detailed construction and the operation of each of the functions will be described hereinbelow.

The main signal relay function 401 receives the PON format main signal 123 from the PON line, converts it into the UNI main signal 125, and transmits it to the UNI. The main signal relay function 401 also receives the UNI main signal 125 from the UNI, converts it into the PON format main signal 123, and transmits it to the PON line. The main signal relay function 401 receives information necessary to decide a proper relay destination when the UNI main signal 125 and the PON format main signal 123 are received from the main signal relay control function 402 and the ONU apparatus control signal processing function 403.

The main signal relay control function 402 executes a path control process by using a part of packet data of the UNI main signal 125 and the PON format main signal 123. A result of the path control process is reflected to the deciding process of the relay destination of the main signal which is executed by the main signal relay function 401. The main signal relay control function 402 has the IGMP snooping process and the like.

The ONU apparatus control signal processing function 403 receives the ONU apparatus control signal 124 from the OLT 101 and executes a control process of the ONU 102 in accordance with contents of the ONU apparatus control signal 124. The ONU apparatus control signal processing function 403 transmits the ONU apparatus control signal 124 to the OLT 101 in accordance with a processing result of the received ONU apparatus control signal 124 and an operation situation of the ONU 102.

The functions of the ONU 102 described above are substantially the same as those of the general ONU.

FIG. 5 is a block constructional diagram showing an example of a construction of the CM apparatus control signal converting function provided for the OLT and a construction of signals which are transmitted and received.

The CM apparatus control signal converting function 304 has a CM IP address obtaining function 501, a CM management information converting function 502, a CM setting obtaining/converting function 503, and a CM time synchronizing function 504. The CM apparatus control signal converting function 304 also has a CM-ONU correspondence table 551.

By an ONU registration signal 541 as a kind of ONU apparatus control signal 124, the CM IP address obtaining function 501 knows that the ONU 102 has newly been registered in the OLT 101. By using this timing as a trigger, the CM IP address obtaining function 501 requests the CM IP address allocation server 261 in the CMTS/CM apparatus management system 250 to obtain the IP address for management and communication of the CM apparatus by using a CM IP address allocation signal 521 as a kind of CM apparatus control signal 322. Thus, when the IP address is successfully obtained, a correspondence between the IP address and the ONU is recorded into the CM-ONU correspondence table 551.

The CM management information converting function 502 receives a management information obtaining (or setting) request based on a CM management information signal 522 as a kind of CM apparatus control signal 322 and converts it into the management information obtaining (or setting) request based on an ONU management information signal 542 as a kind of ONU apparatus control signal 124. A proper ONU is decided as a transfer destination of the request on the basis of a destination IP address of a management information obtaining (or setting) request message by using the CM- ONU correspondence table 551. The request obtained after the conversion is transferred toward the ONU.

When a management information obtaining (or setting) response based on the ONU management information signal 542 is received from the ONU 102, the CM management information converting function 502 converts it into a management information obtaining (or setting) response based on the CM management information signal 522. A response in which each of the transmitting source/destination IP addresses included in an IP header of the management information obtaining (or setting) request corresponding to the management information obtaining (or setting) response is set to a destination/transmitting source IP address is transferred toward the CM management information collecting server 262 in the CMTS/CM apparatus management system 250.

When a management information notification based on the ONU management information signal 542 is received from the ONU 102, the CM management information converting function 502 converts it into a management information notification based on the CM management information signal 522. A CM IP address corresponding to the transmitting source ONU of the management information notification based on the ONU management information signal 542 is decided by using the CM-ONU correspondence table 551. A notification in which such an IP address is set to a transmitting source is transferred toward the CM management information collecting server 262 in the CMTS/CM apparatus management system 250.

By using the IP address registered in the CM-ONU correspondence table 551 as its own side IP address, the CM setting obtaining/converting function 503 obtains CM setting information based on a CM setting information signal 523 as a kind of CM apparatus control signal 322 from the CM setting information management server 263 in the CMTS/CM apparatus management system 250. The CM setting information is set in the OLT itself and converted into an ONU setting information signal 543 as a kind of ONU apparatus control signal 124. The ONU setting information signal 543 obtained after the conversion is transferred toward the ONU which has been made to correspond to the foregoing self-side IP address by the CM-ONU correspondence table 551.

By using a CM time sync signal 524 as a kind of CM apparatus control signal 322, the CM time synchronizing function 504 synchronizes the time of the OLT 101 with the time of the time synchronizing server 264 in the CMTS/CM apparatus management system 250. By using an ONU time sync signal 544 as a kind of ONU apparatus control signal 124, the CM time synchronizing function 504 makes the time synchronization of each ONU registered in the CM-ONU correspondence table 551.

The CM-ONU correspondence table 551 is a table for recording the correspondence between the IP address obtained by a procedure similar to that of the CM and the ONU which has been made to correspond to the IP address.

If the protocol is based on the DOCSIS standard, the protocols such as DHCP, SNMP (a part of the management information notification is Syslog), TFTP, and Time are used for the CM IP address allocation signal 521, CM management information signal 522, CM setting information signal 523, and CM time sync signal 524, respectively.

If the PON is the GE-PON, the MPCP protocol of the IEEE 802.3ah standard is used for a part or all of the ONU registration signal 541, ONU setting information signal 543, and ONU time sync signal 544. An OAM sub-layer of the same standard is used for a part or all of the ONU management information signal 542 and the ONU setting information signal 543.

FIG. 6 is a sequence diagram showing an example of the operation of a CM IP address obtaining function provided for the OLT and is a diagram showing an example of a CM IP address obtaining process.

The OLT 101 executes an ONU registering sequence by transmitting and receiving the ONU registration signal 541 to/from the ONU 102 which has newly been connected (step 610). In more detail, if the PON is the GE-PON, a P2MP (Point to Multipoint) discovery procedure of the MPCP is used and the process is executed by a procedure of a transmission of a GATE (Discovery) message to the ONU (step 611), a reception of a REGISTER_REQ message from the ONU (step 612), a transmission of a REGISTER message to the ONU (step 613), a transmission of a GATE (Normal) message to the ONU (step 614), and a reception of a REGISTER_ACK message from the ONU (step 615). Thus, the OLT 101 enables communication with the ONU 102 to be made, thereby obtaining information such as an unique identifier or the like of the ONU 102.

Subsequently, the OLT 101 registers the ONU unique identifier obtained in step 610 into the CM-ONU correspondence table 551 (step 620).

Subsequently, the OLT 101 executes the CM IP address obtaining sequence by using the CM IP address allocation signal 521 (step 630) in order to obtain the IP address corresponding to the ONU registered in step 620. According to the DOCSIS standard, the DHCP is used and the packet transmission and reception are executed in order of a transmission of a Discovery message to the CM IP address allocation server 261 (step 631), a reception of an Offer message from the CM IP address allocation server 261 (step 632), a transmission of a Request message to the CM IP address allocation server 261 (step 633), and a reception of an Ack message from the CM IP address allocation server 261 (step 634).

Since the unique identifier of the ONU 102 and the CM IP address which has been made to correspond thereto are obtained by the above processes, this pair is recorded into the CM-ONU correspondence table 551 (step 640). Other information obtained in steps 610 and 630 can be also recorded into the CM-ONU correspondence table 551. For example, if the protocol is based on the DOCSIS standard, since the IP address of the CM setting information management server 263 and the file name of the setting information are obtained in step 630, those information may be recorded into the CM-ONU correspondence table 551.

FIG. 7 is a sequence diagram showing an example of the operation of a CM management information converting function provided for the OLT and is a diagram showing an example of a CM management information obtaining process.

The OLT 101 receives a CM management information obtaining (or setting) request message in which one of the IP addresses recorded in the CM-ONU correspondence table 551 is set to a destination from the CM management information collecting server 262 (step 711). The CM management information obtaining (or setting) request message is one of the CM management information signal 522 and according to the DOCSIS standard, a GetRequest message, a SetRequest message, or the like of the SNMP is used.

By using the CM-ONU correspondence table 551, the OLT 101 decides the ONU 102 which has been made to correspond to the destination IP address of the CM management information obtaining (or setting) request message received in step 711 (step 720). The contents of the CM management information obtaining (or setting) request message is converted into the proper ONU management information signal 542 and an ONU management information obtaining (or setting) sequence is executed together with the decided ONU 102 by using the message obtained after the conversion (step 730). If the PON is the GE-PON, for example, the process is executed by using a PDU (Protocol Data Unit) of the OAM sub-layer by a procedure of a transmission of a Variable Request message to the ONU (step 731) and a reception of the Variable Response message from the ONU (step 732). However, another means may be used. By executing the above sequence, the OLT 101 obtains the proper management information (or setting execution result) regarding the ONU 102 as a management information obtaining (or setting) target.

Subsequently, the OLT 101 returns a CM management information obtaining (or setting) response message in which the destination of the original CM management information obtaining (or setting) request message is set to a transmitting source and the transmitting source is set to a destination (step 741). Information obtained by converting the result obtained in step 730 mentioned above into a format of the CM management information signal 522 is included in this response message. According to the DOCSIS standard, a Response message of the SNMP is used as a CM management information obtaining (or setting) response message.

FIG. 8 is a sequence diagram showing an example of the operation of the CM management information converting function provided for the OLT and is a diagram showing an example of a CM management information notifying process.

The OLT 101 receives an ONU management information notification message from the ONU 102 (step 811). The ONU management information notification message is one of the ONU management information signal 542. If the PON is the GE-PON, for example, although an Event Notification message of the OAM sub-layer is used, another means may be used.

By using the CM-ONU correspondence table 551, the OLT 101 decides the IP address which has been made to correspond to the transmitting source ONU 102 of the ONU management information notification message received in step 811 (step 820). The contents of the ONU management information notification message are converted into the proper CM management information signal 522 and a CM management information notification message in which the IP address decided in step 820 is set to the transmitting source is transmitted toward the CM management information collecting server 262 (step 831). The CM management information notification message is one of the CM management information signal 522. According to the DOCSIS standard, a Trap message of the SNMP, a Syslog protocol message, or the like is used.

Although the management information notification message which is transmitted from the ONU to the OLT has been shown in step 811 in FIG. 8, it is also possible to use a construction in which the management information notification message is periodically sent from the OLT to the ONU, the OLT receives a response message from the ONU corresponding to the management information notification message, and the OLT executes the processes in step 820 and subsequent steps by using a change in contents of such a response as a trigger.

Figure 9:
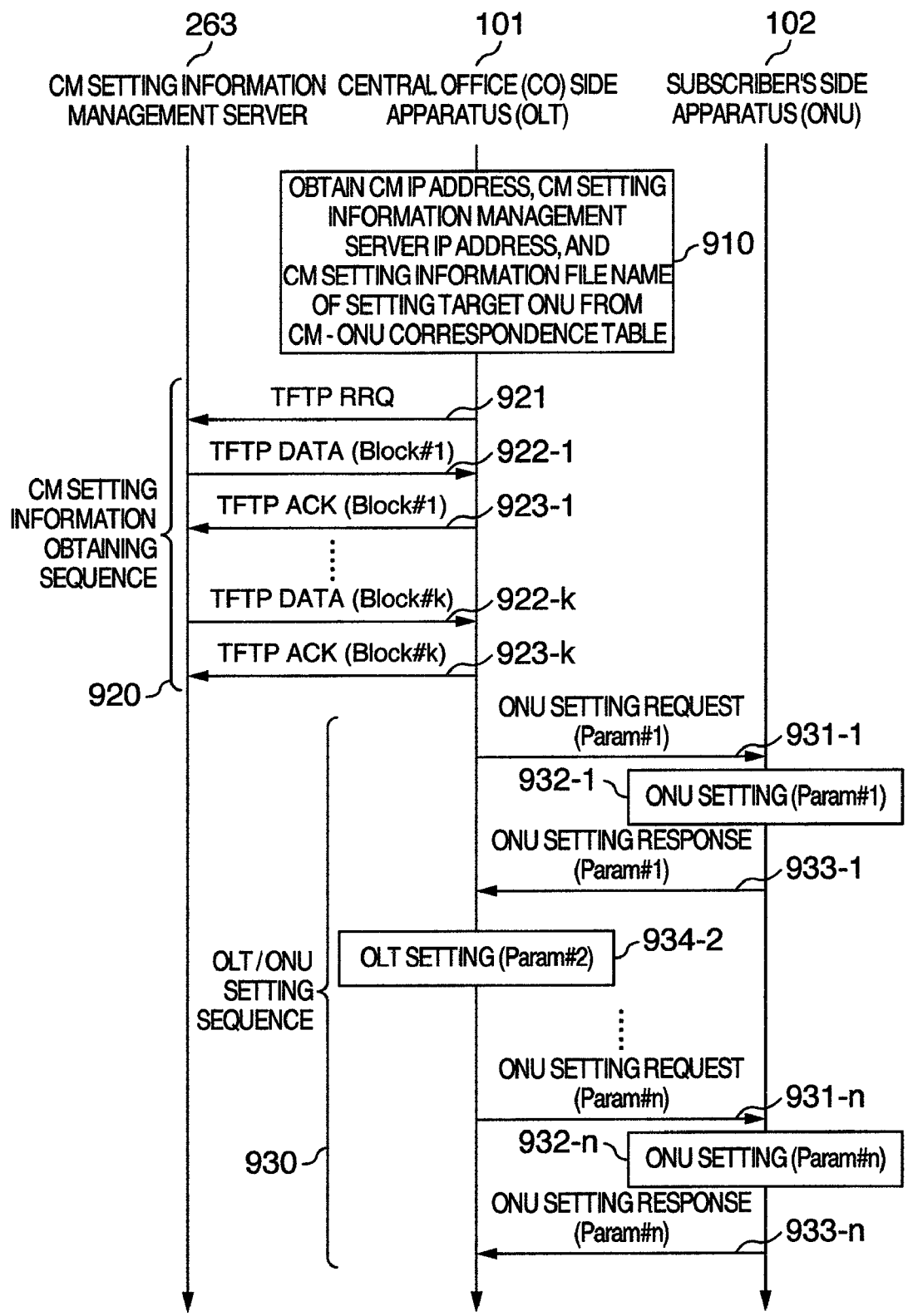
FIG. 9 is a sequence diagram showing an example of the operation of a CM setting obtaining/converting function provided for the OLT.

FIG. 9 is a sequence diagram showing an example of the operation of a CM setting obtaining/converting function provided for the OLT and is a diagram showing an example of the CM setting process.

By using the CM-ONU correspondence table 551, the OLT 101 obtains the CM IP address which has been made to correspond to the ONU as a target of the setting process, the IP address of the CM setting information management server 263, and the file name of the CM setting information (step 910). With respect to the IP address of the CM setting information management server 263 and the CM setting information file name, values which have been preset in the OLT may be used instead of obtaining them from the CM-ONU correspondence table 551. The above process is generally executed just after the end of the processes in FIG. 6 (or, further after completion of the time synchronization). In such a case, since the CM IP address, the IP address of the CM setting information management server 263, and the CM setting information file name have already been known until step 640 in FIG. 6, step 910 can be omitted.

The OLT 101 executes the CM setting information obtaining sequence by using the information obtained by the foregoing procedure (step 920). Specifically speaking, the CM setting information file is obtained from the CM setting information management server 263 by using the IP address of the CM setting information management server 263 and the CM setting information file name. The CM IP address which has already been obtained is used as a PON side IP address at the time when the CM setting information obtaining sequence is executed. The CM setting information obtaining sequence is executed by using the CM setting information signal 523. According to the DOCSIS standard, the sequence is executed in a form of obtaining the file by the TFTP. That is, the sequence is executed by repeating the following procedure k times (k denotes the total number of blocks in the case where the CM setting information file is divided into TFTP data blocks): a transmission of an RRQ (Read ReQuest) message to the CM setting information management server (step 921); a subsequent reception of a DATA message from the CM setting information management server (step 922); and a transmission of an ACK message to the CM setting information management server (step 923).

Subsequently, the OLT 101 executes an OLT/ONU setting sequence by using the obtained CM setting information file (step 930). Specifically speaking, by using an algorithm shown in FIG. 13 which will be described in detail hereinafter, the OLT 101 sequentially interprets setting parameters included in the CM setting information file. The contents of the setting parameters are converted into the ONU setting information signal 543 or the settings to the OLT itself or into both of them (there is also a possibility that the contents of the setting parameters are not converted into any of them). In the case where they are converted into the settings to the OLT itself, the settings are reflected to the OLT (step 934). In the case where they are converted into the ONU setting information signal 543, an ONU setting request message is transmitted to the ONU 102 as a setting target (step 931). The ONU 102 which received the ONU setting request message reflects the requested setting to itself (step 932) and returns an ONU setting response message toward the OLT (step 933). Each of the ONU setting request message and the ONU setting response message is one of the ONU setting information signal 543.

A specific protocol and a detailed message transmitting and receiving sequence which are used for the ONU setting request message and the ONU setting response message differ depending on the setting contents. For example, in the case of making a setting of an upstream communication bandwidth which is allocated to the ONU in the GE-PON, a GATE message of the MPCP is used as an ONU setting request message and the ONU setting response message is not transmitted. In the case of making another setting, there is also a case where the OAM sub-layer is used.

FIG. 10 is a sequence diagram showing an example of the operation of a CM time synchronizing function provided for the OLT and is a diagram showing an example of a CM time synchronizing process.

The OLT 101 executes a time synchronizing sequence by using an IP address of the time synchronizing server 264 obtained by the CM IP address obtaining sequence in step 630 (FIG. 6) or by a previous setting (step 1010). As a PON side IP address in this instance, either one of the CM IP addresses registered in the CM-ONU correspondence table 551 or another IP address allocated to the OLT 101 of the invention can be used. The CM time synchronizing sequence is executed by using the CM time sync signal 524. According to the DOCSIS standard, the sequence is executed by using, for example, a Time protocol. However, another time synchronizing protocol, for example, an NTP (Network Time Protocol) may be used. In the case of using the Time protocol, in this time synchronizing sequence, the packet transmission and reception are executed in order of a transmission of a Request message to the time synchronizing server 264 (step 1011) and a reception of a Response message from the time synchronizing server 264 (step 1012). On the basis of an execution result of the time synchronizing sequence, the OLT 101 synchronizes the time of a built-in timer with the time synchronizing server 264 (step 1013).

The OLT 101 properly executes the ONU time synchronizing sequence together with each ONU 102 which has already been registered in the PON (step 1020). The ONU time synchronizing sequence is executed by using the ONU time sync signal 544. In the case of the GE-PON, the MPCP is used and the sequence is executed by a procedure of a transmission of a GATE message to the ONU (step 1021) and a reception of a REPORT message from the ONU (step 1022). On the basis of an execution result of the ONU time synchronizing sequence, the ONU 102 synchronizes the time of the built-in timer with the OLT 101 (step 1023).

FIG. 11 is a constructional diagram of a memory showing an example of a construction of the CM-ONU correspondence table provided for the OLT.

A CM IP address 1101 obtained by the CM IP address obtaining process and an ONU unique identifier 1104 corresponding to the CM IP address are recorded in the CM-ONU correspondence table 551. Although the MAC address of the ONU 102 is used as an ONU unique identifier 1104 here, another information can be used so long as it can unconditionally identify the ONU 102. For example, a combination of an LLID allocated to each ONU and the number which unconditionally indicates a PON line to which the ONU has been connected can be also used. Further, for example, various kinds of information such as CM setting information management server IP address 1102, CM setting information file name 1103, and the like which are set every CM may be included in the CM-ONU correspondence table 551.

FIG. 12 is a frame constructional diagram showing an example of a construction of the CM setting information file which is obtained from the CM setting information management server by the OLT by the CM setting information obtaining sequence.

The CM setting information file is constructed by 0 or more setting parameters 1210, a CM MIC (Message Integrity Check) 1220, a CMTS MIC 1230, and an End of Data 1240.

Each parameter (including CM MIC, CMTS MIC) other than the End of Data 1240 has a TLV (Type-Length-Value) format constructed by a type 1211, a length 1212, and a value 1213. A type value showing the meaning of each parameter 1210 is stored in the type 1211. A specific type value allocated to each of the CM MIC 1220 and the CMTS MIC 1230 is stored in each of them. The length 1212 indicates a byte length of the value 1213. A setting value of each setting parameter 1210 is stored in the value 1213. A hash value calculated on the basis of all or a part of the setting parameters is stored in the value 1213 of the CM MIC 1220 and the CMTS MIC 1230. The End of Data 1240 is constructed only by a specific type value indicative of a termination of the file.

Although the CM setting information file format according to the DOCSIS standard has been used in the above description, the invention can be also embodied even if it does not conform with such a format.

Figure 13:
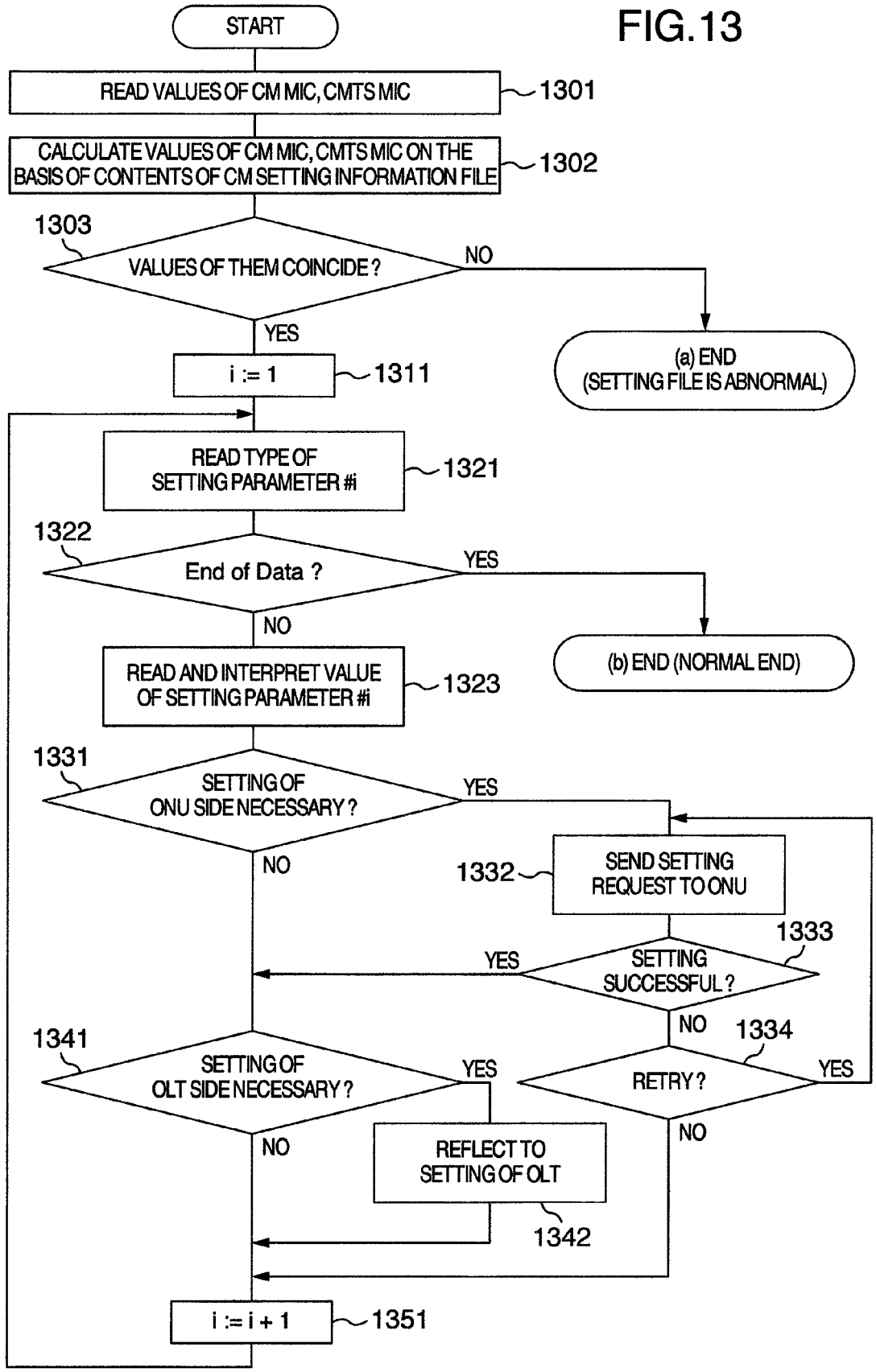
FIG. 13 is an operation flowchart showing an example of the operation of the CM setting obtaining/converting function provided for the OLT.

FIG. 13 is an operation flowchart showing an example of the operation of the CM setting obtaining/converting function provided for the OLT and is a diagram showing an example of a process which is executed by the OLT/ONU setting sequence.

When the CM setting information file is obtained by the CM setting information obtaining sequence in FIG. 9, first, the CM setting obtaining/converting function 503 in the OLT 101 searches for the parameters of the CM MIC and the CMTS MIC from the file and reads out their values (step 1301). Subsequently, hash values of the CM MIC and CMTS MIC are calculated on the basis of all or a part of the setting parameters in the CM setting information file (step 1302). The MIC value in step 1301 and the MIC value in step 1302 are compared (step 1303). If they do not coincide, it is regarded that there is an abnormality in the CM setting information file, and the process regarding the CM setting information file is finished. If they coincide, the processing routine advances to next step.

Subsequently, a loop variable i is initialized to "1" in order to sequentially read the setting parameters (step 1311) and the type of the ith setting parameter from the top is read out (step 1321). If the type value indicates the End of Data (step 1322), it is regarded that the setting corresponding to the setting file has been completed, and the process regarding the CM setting information file is finished.

If the type value indicates other than the End of Data, the value of the setting parameter is read out and what kind of settings are necessary in the PON are interpreted together with the type value (step 1323).

If the setting of the ONU is necessary (step 1331) as a result of the interpretation in step 1323, the corresponding ONU setting request message is transmitted to the ONU (step 1332). Thus, if the setting has successfully been made (if an ONU setting response message showing the success in the setting has been received or if it is a setting request without the corresponding ONU setting response message), step 1341 follows (step 1333). If the setting has failed (if an ONU setting response message showing the failure of the setting has been received), whether or not the setting should be retried is discriminated on the basis of the contents of the failure, the number of retry times so far, or the like (step 1334). If the setting should be retried, the processing routine is returned to step 1332. If the setting should not be retried, step 1351 follows.

If the setting on the ONU side is unnecessary or if the setting on the ONU side has successfully been made, the necessity about the setting on the OLT side is discriminated (step 1341) on the basis of the result of the interpretation in step 1323. If the setting on the OLT side is necessary, the setting is reflected to the OLT (step 1342).

If the setting process of the ith setting parameter from the top is finished by the above operation, the loop variable i is incremented by "1" (step 1351) and the processing routine is returned to step 1321. Although the MIC value checking process in steps 1301 to 1303 is included as a process based on the DOCSIS standard, the invention can be also embodied even if such a process is not executed.

Figure 14:
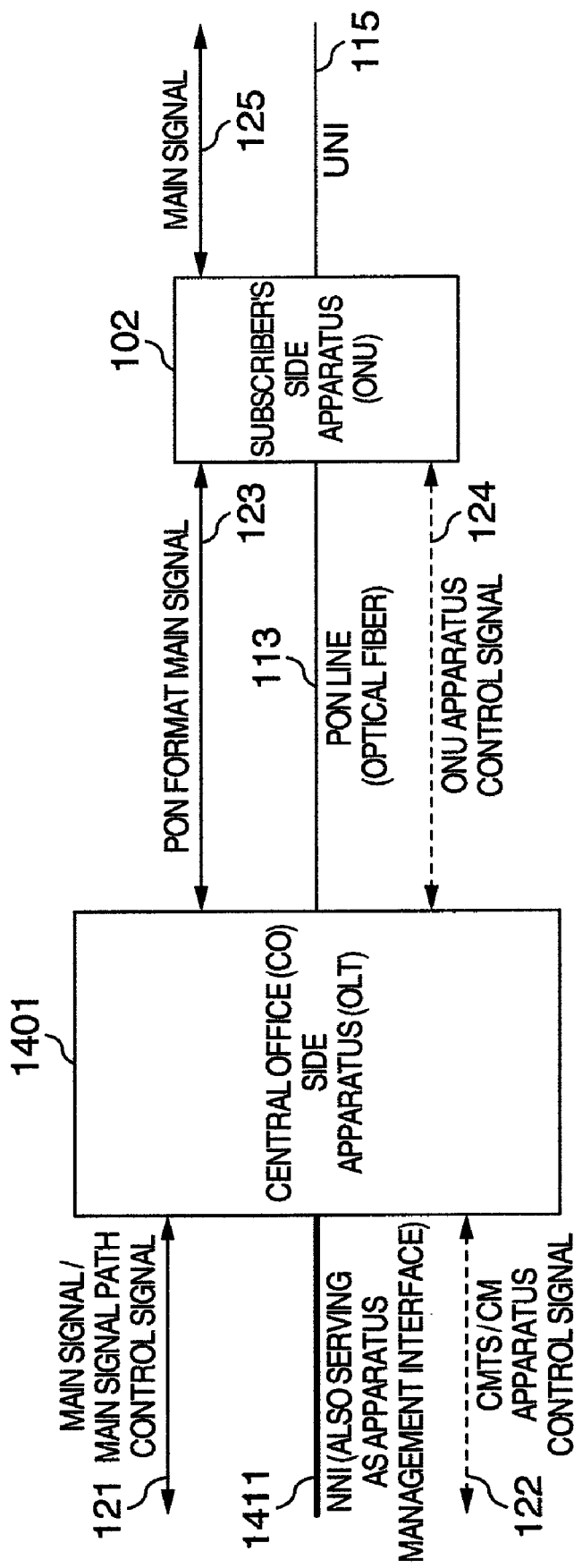
FIG. 14 is an explanatory diagram showing another example of a construction of apparatuses of the PON and the communication interface and a construction of signals which are transmitted and received.

Another constructional example and the operation of a communication system using the PON of the invention will be further described hereinbelow with reference to the drawings. FIG. 14 is an explanatory diagram showing another example of a construction of apparatuses of the PON and the communication interface and a construction of signals which are transmitted and received.

In the PON described above, the NNI 111 as a physical interface for the main signal/main signal path control signal 121 and the apparatus management interface 112 as a physical interface for the CMTS/CM apparatus control signal 122 are the different physical interfaces. The communication system which will be described hereinbelow differs from the foregoing PON with respect to a point that a same NNI (also serving as an apparatus management interface) 1411 is used as both of the physical interfaces.

The main signal/main signal path control signal 121 and the CMTS/CM apparatus control signal 122 are logically separated at layer 2 by a VLAN (Virtual LAN) or the like or distinguished by the transmitting source or destination IP address of the packet.

Figure 15:
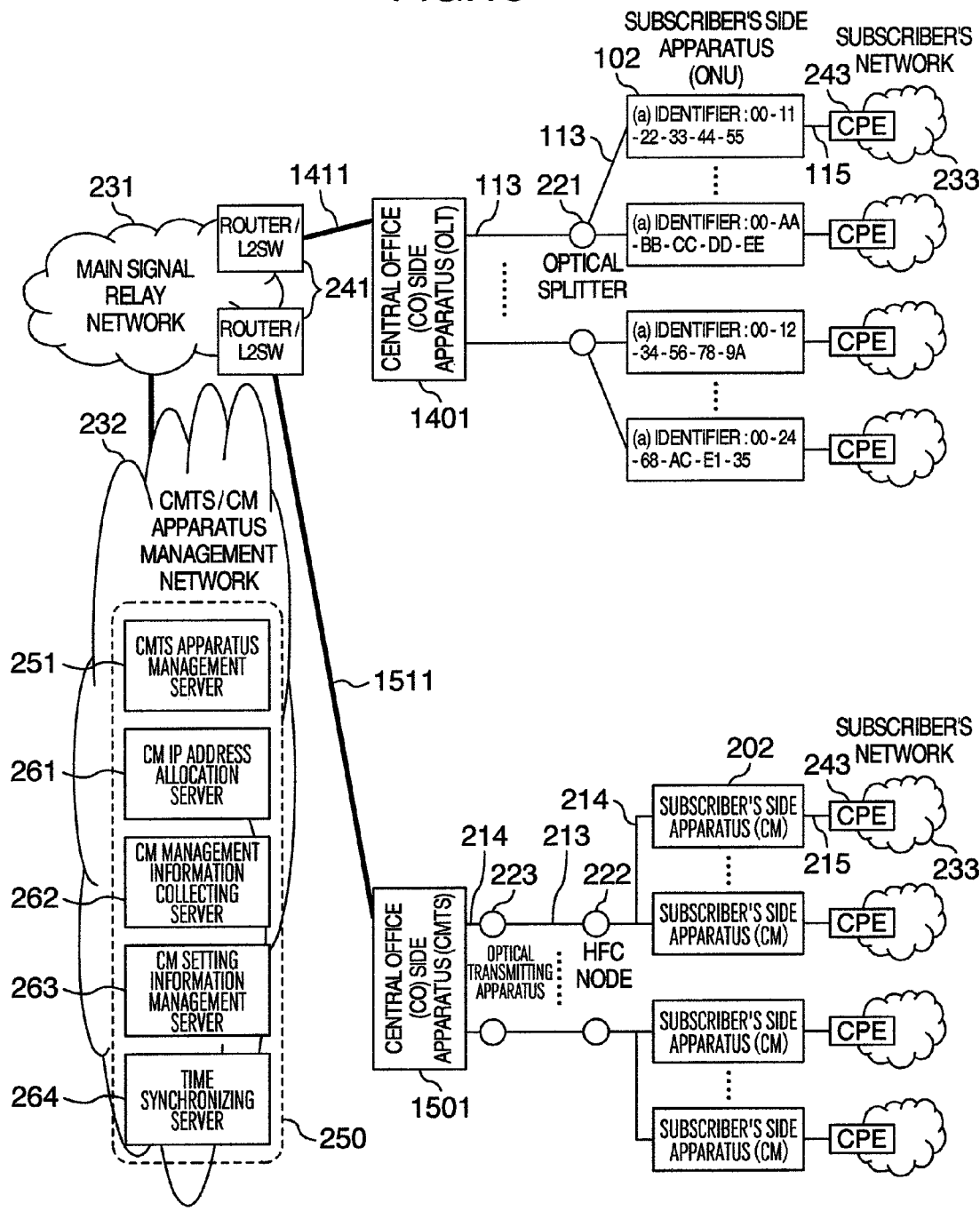
FIG. 15 is a system constructional diagram showing another example of a construction of the communication system using the PON of the invention.

FIG. 15 is a system constructional diagram showing another example of a construction of the communication system using the PON of the invention.

In the communication system described above, also with respect to the CMTS 201, the NSI 211 as a physical interface for the main signal/main signal path control signal and the apparatus management interface 212 as a physical interface for the CMTS/CM apparatus control signal are the different physical interfaces. On the other hand, in a CMTS 1501 of another communication system shown in the diagram, their physical interfaces are a same NSI (also serving as an apparatus management interface) 1511.

Both of the NNI (also serving as an apparatus management interface) 1411 of an OLT 1401 and the NSI (also serving as an apparatus management interface) 1511 of the CMTS 1501 are connected to the router/layer 2 switch 241 serving as a node of the main signal relay network 231. The CMTS/CM apparatus control signal passes temporarily through the main signal relay network together with the main signal and is relayed to the CMTS/CM apparatus management network 232 by the layer 2 switching or the IP routing.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communication system in which said communication system is a first communication network having a first master station apparatus, a plurality of first slave station apparatuses, a transmission path for connecting said master station and said plurality of slave stations, and a managing apparatus for making management control of the first communication network and a passive optical network in which said managing apparatus communicates a first control signal and a monitor signal with said first master station apparatus and each of said plurality of first slave stations by a first communication protocol, and monitors and controls said first master station apparatus and each of said plurality of first slave stations, thereby transmitting and receiving signals between an uplink communication network connected to said first master station apparatus and a terminal connected to each of said plurality of first slave stations, comprising:

the passive optical network which is constructed by a second master station apparatus, a plurality of second slave station apparatuses, and an optical transmitting path for connecting said master station and said plurality of slave stations and in which said second master station apparatus and each of said plurality of second slave stations communicate a second control signal and a monitor signal by using a second communication protocol and monitor and control said second master station and said plurality of slave stations, thereby transmitting and receiving signals between said uplink communication network connected to said second master station apparatus and a terminal connected to each of said plurality of second slave stations, wherein said second master station has an interface for transmitting and receiving said first communication protocol to/from said managing apparatus, a processing unit for processing said first communication protocol, said first control signal, and said monitor signal, and a converting unit for converting said first communication protocol, said first control signal, and said monitor signal into said second communication protocol, said second control signal, and said monitor signal on the basis of an output of said processing unit, and said managing apparatus and said second master station of said passive optical network are connected and said managing apparatus transmits and receives said first control signal and said monitor signal to/from said second master station by said first communication protocol, thereby executing the transmission and reception of the signals between said uplink communication network and said terminal through said passive optical network.

2. A system according to claim 1, wherein said passive optical network is a network in which said interface, said processing unit, and said converting unit are provided for a master station of a passive optical network specified in an ITU-T Recommendation G983 or IEEE standard 802.3ah.

3. A system according to claim 1, wherein said first master station apparatus and said first slave station apparatus are a cable modem termination apparatus and a cable modem specified in a DOCSIS standard, and said first control signal, said monitor signal, and said first communication protocol are also signals and a communication protocol specified in the DOCSIS standard, respectively.

4. A passive optical network connected to a communication system which is a first communication network having a first master station apparatus, a plurality of first slave station apparatuses, a transmission path for connecting said master station and said plurality of slave stations, and a managing apparatus for making management control of the first communication network and the passive optical network in which said managing apparatus communicates a first control signal and a monitor signal with said first master station apparatus and each of said plurality of first slave stations by a first communication protocol and monitors and controls said first master station apparatus and each of said plurality of first slave stations, thereby transmitting and receiving signals between an uplink communication network connected to said first master station apparatus and a terminal connected to each of said plurality of first slave stations, wherein said passive optical network is constructed by a second master station apparatus, a plurality of second slave station apparatuses, and an optical transmitting path for connecting said master station and said plurality of slave stations and is constructed in such a manner that said second master station apparatus and each of said plurality of second slave stations communicate a second control signal and a monitor signal by using a second communication protocol and monitor and control said second master station and said plurality of slave stations, thereby transmitting and receiving signals between said uplink communication network connected to said second master station apparatus and a terminal connected to each of said plurality of second slave stations, said second master station of said passive optical network has an interface for transmitting and receiving said first communication protocol to/from said managing apparatus, a processing unit for processing said first communication protocol, said first control signal, and said monitor signal, and a converting unit for converting said first communication protocol, said first control signal, and said monitor signal into said second communication protocol, said second control signal, and said monitor signal on the basis of an output of said processing unit, and said managing apparatus and said second master station of said passive optical network are connected and said managing apparatus transmits and receives said first control signal and said monitor signal to/from said second master station by said first communication protocol, thereby executing the transmission and reception of the signals between said uplink communication network and said terminal through said passive optical network.

5. A network according to claim 4, wherein said passive optical network is a network in which said interface, said processing unit, and said converting unit are provided for a master station of a passive optical network specified in an ITU-T Recommendation G983 or IEEE standard 802.3ah.

6. A communication system for making communication by an optical fiber between two points, wherein said communication system has a first communicating apparatus arranged at a first point and a second communicating apparatus arranged at a second point, said first communicating apparatus has a first communication interface for communicating with said second communicating apparatus and a second communication interface and a third communication interface for connecting to communicating apparatuses outside of said communication system, said second communicating apparatus has a fourth communication interface for communicating with said first communicating apparatus and a fifth communication interface for connecting to communicating apparatuses outside of said communication system, said first communication interface of said first communicating apparatus and said fourth communication interface of said second communicating apparatus are connected by an optical fiber or a communication path constructed by a combination of an apparatus for relaying a photosignal and the optical fiber, said first communicating apparatus and said second communicating apparatus relay a main signal communication packet between said second communication interface of said first communicating apparatus and said fifth communication interface of said second communicating apparatus by using said communication path, said first communicating apparatus executes control of an operation and collection of state information of said second communicating apparatus by transmitting and receiving a control signal based on a first control protocol through said communication path, unlike said first control protocol, said first communicating apparatus receives the control of an operation and the collection of the state information of said second communicating apparatus by transmitting and receiving a control signal based on said second control protocol which is used for control of a plurality of cable modems through said third communication interface, said first communicating apparatus converts said second control protocol received from said third communication interface into said first control protocol and sends it to said first communication interface, and said first communicating apparatus converts said first control protocol received from said first communication interface into said second control protocol and sends it to said third communication interface.

7. A system according to claim 6, wherein when said first communicating apparatus detects a registration of said second communicating apparatus by said first control protocol, said first communicating apparatus requests an allocation of an identifier which is allocated every said cable modem by using said second control protocol, and by receiving a response to said request, said first communicating apparatus manages a correspondence between the allocated received identifier and said second communicating apparatus.

8. A system according to claim 6, wherein when said first communicating apparatus receives a communication message of a request for an obtainment or setting of management information to said cable modem by said second control protocol, said first communicating apparatus executes the obtainment or the setting of the management information to said second communicating apparatus by using said first control protocol and transmits a communication message of a response by said second control protocol.

9. A system according to claim 6, wherein when said first communicating apparatus receives management information of said second communicating apparatus by said first control protocol, said first communicating apparatus transmits a communication message for transmitting the management information from said cable modem by using said second control protocol.

* * * * *